US012560305B2

(12) United States Patent
Hamano

(10) Patent No.: US 12,560,305 B2
(45) Date of Patent: Feb. 24, 2026

(54) ILLUMINATION DEVICE

(71) Applicant: Japan Display Inc., Tokyo (JP)

(72) Inventor: Daisuke Hamano, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/070,887

(22) Filed: Mar. 5, 2025

(65) Prior Publication Data

US 2025/0198600 A1 Jun. 19, 2025

Related U.S. Application Data

(63) Continuation of application No. PCT/JP2023/025375, filed on Jul. 10, 2023.

(30) Foreign Application Priority Data

Sep. 7, 2022 (JP) ................................ 2022-142038

(51) Int. Cl.
*F21V 14/00* (2018.01)
*F21V 19/00* (2006.01)
*F21V 23/00* (2015.01)

(52) U.S. Cl.
CPC .......... *F21V 14/003* (2013.01); *F21V 19/003* (2013.01); *F21V 23/003* (2013.01)

(58) Field of Classification Search
CPC .... F21V 14/003; F21V 19/003; F21V 23/003; F21V 14/00; F21V 19/00; F21V 19/001; F21V 19/0035; F21V 21/00; F21V 23/00; F21V 23/007; F21V 29/502; F21V 29/503; F21K 9/65; F21Y 2115/10; F21S 2/00
See application file for complete search history.

(56) References Cited

U.S. PATENT DOCUMENTS 9,115,854 B2 * 8/2015 Chiu ........................ F21K 9/23
2012/0033429 A1 * 2/2012 Van De Ven .......... H05B 45/30
362/294
2013/0051036 A1 2/2013 Totani et al.
2015/0137678 A1 5/2015 Chiu et al.

FOREIGN PATENT DOCUMENTS

JP 2013-048029 A 3/2013
JP 2015-097189 A 5/2015

OTHER PUBLICATIONS

Search Report issued in International Patent Application No. PCT/JP2023/025375, mailed on Sep. 19, 2023 and English translation of same. 5 pages.

* cited by examiner

*Primary Examiner* — Bao Q Truong
(74) *Attorney, Agent, or Firm* — K&L Gates LLP

(57) ABSTRACT

An illumination device includes: a light source; a liquid crystal panel disposed on one side of the light source; a first holder having a central axis extending in the first direction and holding the light source; a second holder including a rotational support part, a panel holding cover, and a coupling part, the rotational support part supporting the first holder rotatably in a circumferential direction, the panel holding cover holding the liquid crystal panel, the coupling part coupling the rotational support part and the panel holding cover; a control board disposed on another side in the first direction of the first holder and controls the liquid crystal panel; and a wire extending in the first direction and electrically coupling the liquid crystal panel and the control board. Further, the second holder includes a wire support part supporting part of the wire.

7 Claims, 17 Drawing Sheets

ILLUMINATION DEVICE

CROSS-REFERENCE TO RELATED APPLICATION

This application claims the benefit of priority from Japanese Patent Application No. 2022-142038 filed on Sep. 7, 2022 and International Patent Application No. PCT/JP2023/025375 filed on Jul. 10, 2023, the entire contents of which are incorporated herein by reference.

BACKGROUND

1. Technical Field

The present disclosure relates to an illumination device.

2. Description of the Related Art

An illumination device including a light source such as an LED is publicly known (refer to Japanese Patent Application Laid-open Publication No. 2013-48029 (JP-A-2013-48029) and Japanese Patent Application Laid-open Publication No. 2015-97189 (JP-A-2015-97189), for example). The illumination device of JP-A-2013-48029 is an LED lamp including a base, an LED (light source), and a tubular member coupling the base and the LED. The tubular member is flexible, which allows the orientation of the LED relative to the base to be changed by bending the tubular member relative to the axial direction. The illumination device of JP-A-2015-97189 is an LED light bulb including a base, an LED (light source), and a coupling member coupling the base and the LED, and the length of the coupling member can be changed in the axial direction. Thus, the light distribution angle of the illumination device is converted to an omnidirectional type or a downward type by changing the length of the coupling member to change the distance between the base and the LED in the axial direction.

SUMMARY

There is a need for providing an illumination device capable of rotating the light distribution pattern about the axial center.

According to an aspect, an illumination device includes: a light source; a liquid crystal panel disposed on one side in a first direction of the light source; a first holder having a central axis extending in the first direction and holding the light source; a second holder including a rotational support part, a panel holding cover, and a coupling part, the rotational support part being provided on an outer peripheral side of the first holder and supporting the first holder rotatably in a circumferential direction about the central axis, the panel holding cover holding the liquid crystal panel, the coupling part coupling the rotational support part and the panel holding cover; a control board disposed on another side in the first direction of the first holder and configured to control the liquid crystal panel; and a wire extending in the first direction and electrically coupling the liquid crystal panel and the control board. Further, the second holder includes a wire support part supporting part of the wire.

DETAILED DESCRIPTION

In a case where the shape (light distribution pattern) of emission light from an illumination device is not a circular shape centered at the optical axis (for example, is elongated in one direction), the illumination device is desired to be capable of rotating the light distribution pattern about the axial center.

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate.

What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

First Embodiment

Figure 1:
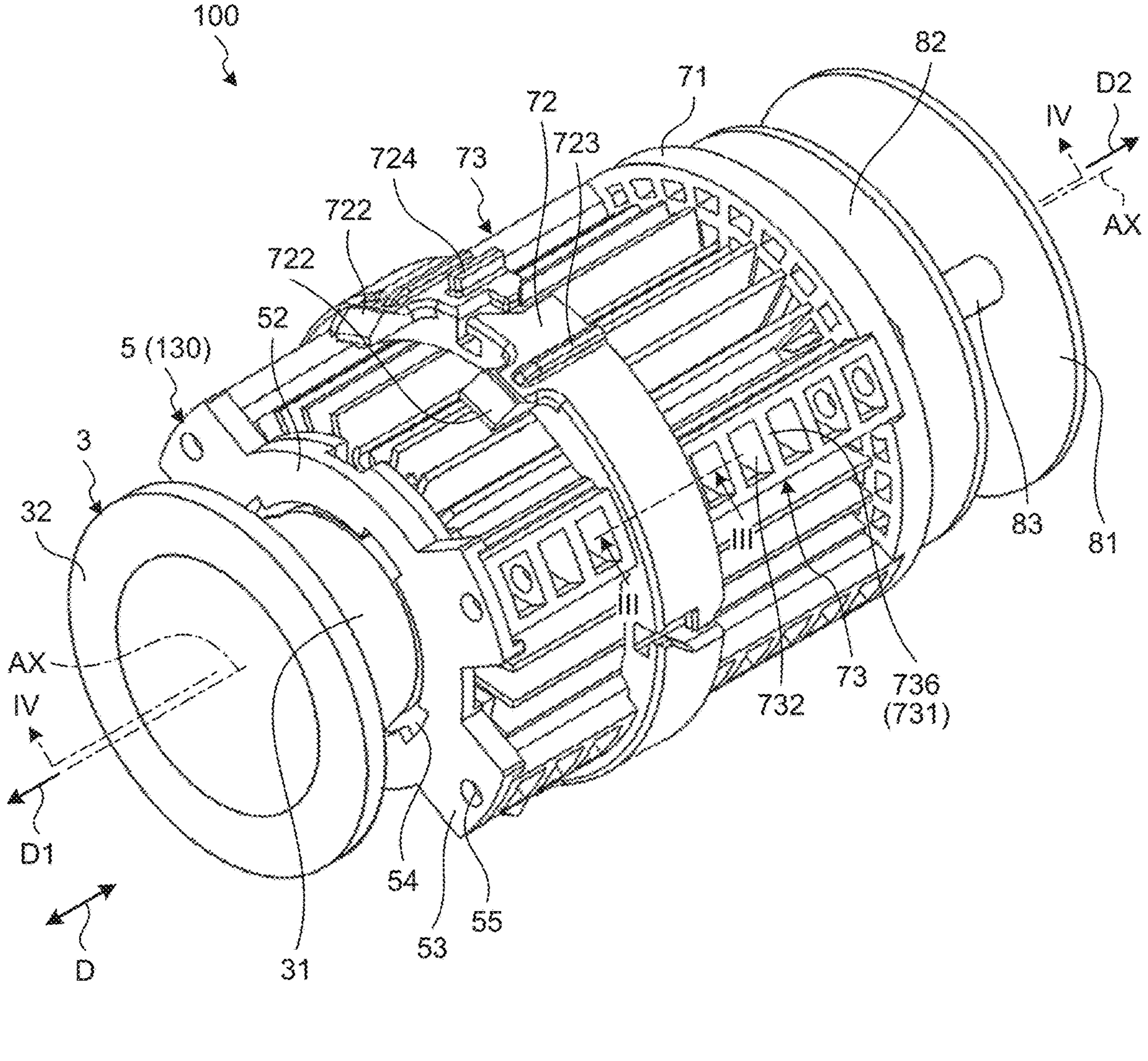
FIG. 1 is a schematic perspective view of an illumination device according to a first embodiment.
Figure 2:
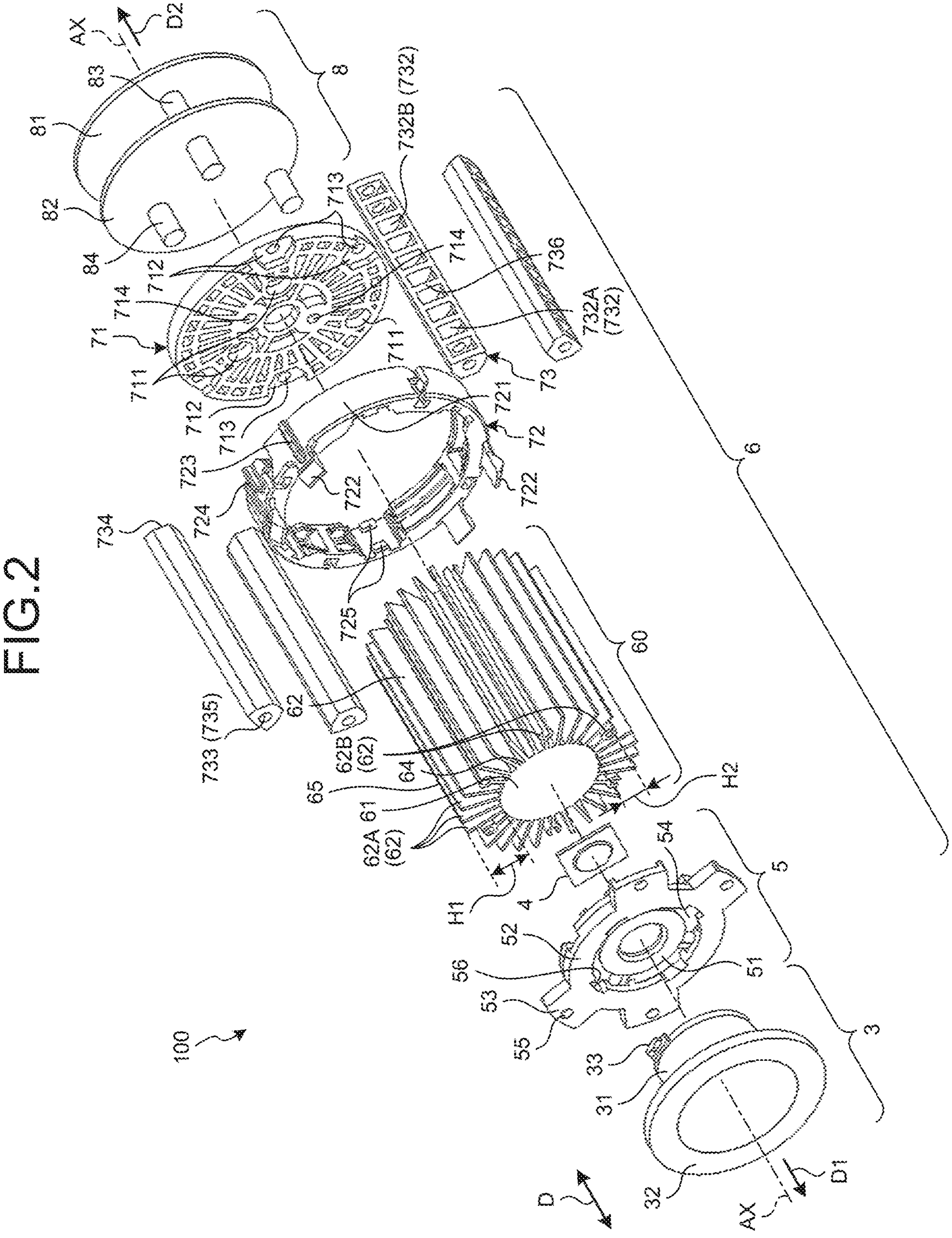
FIG. 2 is an exploded perspective view of FIG. 1.
Figure 3:
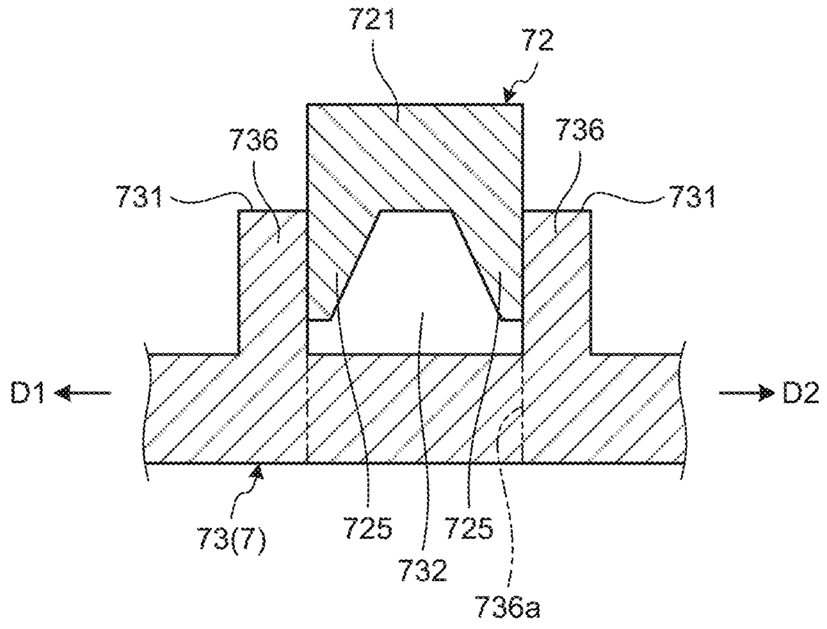
FIG. 3 is a schematic sectional view along line III-III in FIG. 1.
Figure 4:
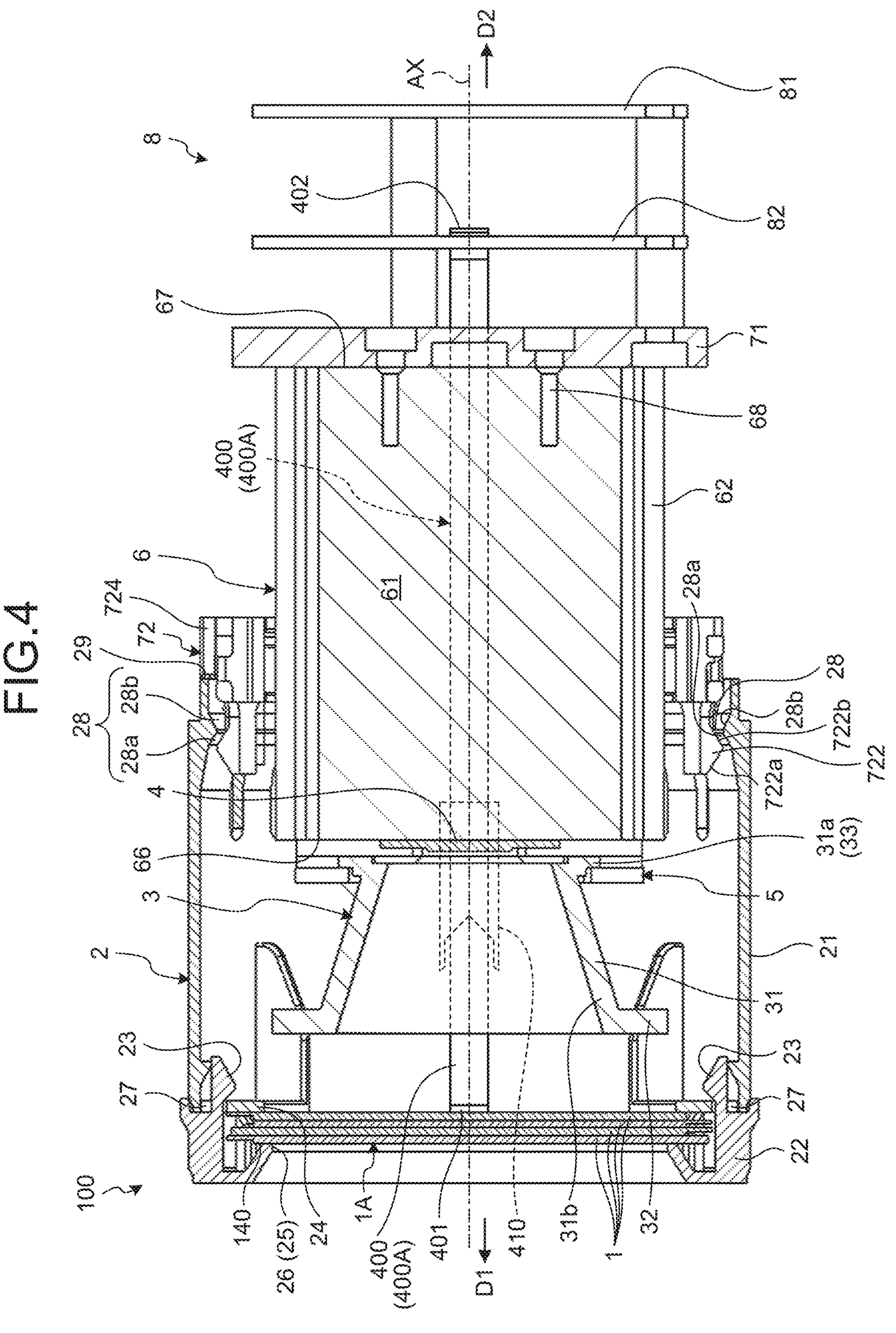
FIG. 4 is a schematic sectional view along line IV-IV in FIG. 1.

First, the structure of an illumination device according to a first embodiment will be described below. FIG. 1 is a schematic perspective view of the illumination device according to the first embodiment. FIG. 2 is an exploded perspective view of FIG. 1. FIG. 3 is a schematic sectional view along line III-III in FIG. 1. FIG. 4 is a schematic sectional view along line IV-IV in FIG. 1.

As illustrated in FIGS. 1 to 4, an illumination device 100 includes an optical element 1A, a reflector 3, an LED (light source) 4, a first holder 6, a second holder 2, a control board 8, and a flexible printed circuit board (wire) 400. The illumination device 100 has a central axis AX. The central axis AX extends in an axial direction. The axial direction is also referred to as a D direction or a first direction, one side in the axial direction is a D1 side (one side in the first direction), and the other side in the axial direction is a D2 side (the other side in the first direction).

The optical element 1A includes a plurality of liquid crystal panels 1. Each liquid crystal panel 1 has a thin flat plate shape, and for example, the four liquid crystal panels 1 overlap in the axial direction. In other words, the optical element 1A according to the present embodiment includes the four liquid crystal panels 1 overlapping in the axial direction. The number of liquid crystal panels 1 is not particularly limited. The liquid crystal panels 1 are alternately stacked in the axial direction as a liquid crystal panel 1 for p-wave polarization and a liquid crystal panel 1 for s-wave polarization. The configuration of each liquid crystal panel 1 will be described later in detail. The LED (light emitting diode) 4 is a light-emitting diode and a type of light source. Various kinds of light sources other than the LED are applicable.

As illustrated in FIG. 4, the second holder 2 is a housing covering a front part of the illumination device 100 illustrated in FIG. 1 and includes a coupling part 21, a panel holding cover 22, and a first convex part (rotation support part or fitting part) 28. The panel holding cover 22 is a cover body serving as a front face of the illumination device 100 and positioned on the D1 side, which is the one side in the axial direction, of the coupling part 21. The panel holding cover 22 includes a holding piece 26 on the D1 side. The inner peripheral side of the holding piece 26 is an opening part 25. The panel holding cover 22 includes a click part 23 on the D2 side. A plurality of click parts 23 are provided in the circumferential direction about the central axis AX.

The coupling part 21 is provided with a support member 24 at an end part on the D1 side and provided with the first convex part 28 at an end part on the D2 side. The support member 24 rises inward in the radial direction. A fitting groove 27 is provided at an outside part of the support member 24 in the radial direction. The panel holding cover 22 is attached to the coupling part 21 when the click part 23, which is a tubular body, is fitted to the fitting groove 27. In addition, an outer peripheral end part 140 of the optical element 1A is sandwiched between the support member 24 and the holding piece 26. Accordingly, the optical element 1A is attached to the second holder 2. The second holder 2 is rotatably attached to the first holder 6 when the first convex part 28 of the coupling part 21 is fitted to a second convex part 722 of the first holder 6. The first holder 6 will be described in detail later.

As illustrated in FIG. 4, the first convex part 28 is positioned on the outer peripheral side of an annular member 72 of the first holder 6. The first convex part 28 has a triangular sectional shape protruding inward in the radial direction. The first convex part 28 has tilted surfaces 28*a* and 28*b*. The tilted surface 28*a* is tilted inward in the radial direction as the position moves to the D2 side, and the tilted surface 28*b* is tilted outward in the radial direction as the position moves to the D2 side.

As illustrated in FIGS. 1 and 2, a plurality of second convex parts 722 of the first holder 6 are provided on the annular member 72. The second convex parts 722 are disposed at intervals in the circumferential direction about the central axis AX. Each second convex part 722 elastically deforms in the radial direction around a root part with an annular body 721 as described later. As illustrated in FIG. 4, each second convex part 722 has a triangular sectional shape protruding outward in the radial direction. Each second convex part 722 has tilted surfaces 722*a* and 722*b*. The tilted surface 722*a* is tilted outward in the radial direction as the position moves to the D2 side, and the tilted surface 722*b* is tilted inward in the radial direction as the position moves to the D2 side. The tilted surface 28*a* of the first convex part 28 slides relative to the tilted surfaces 722*b* of the second convex parts 722. In this manner, the first convex part 28 is a rotation support part supporting the second holder 2 rotatably relative to the first holder 6.

As illustrated in FIGS. 1 and 2, a protrusion 724 protrudes outward in the radial direction on the outer peripheral surface of the annular member 72. The protrusions 724 are disposed on the D2 side of the second convex parts 722. Accordingly, as illustrated in FIG. 4, the first convex part 28 and an end part 29 (refer to FIGS. 4, 9B, and 10B) of the second holder 2 are fitted between the second convex parts 722 and the protrusions 724. Specifically, the first convex part 28 of the second holder 2 is fitted on the D2 side of the second convex parts 722 of the first holder 6, and the end part 29 is fitted on the D1 side of the protrusions 724. Thus, the first convex part 28 and the end part 29 of the second holder 2 are a fitting part, and the second convex parts 722 and the protrusions 724 of the first holder 6 are a fitting counterpart.

As illustrated in FIGS. 1 to 4, the reflector 3 includes a body part 31, a flange 32, and a protrusion 33. The reflector 3 is positioned on the D1 side of the LED 4. The body part 31 has a tubular shape. Specifically, the body part 31 has a tubular shape with a radius that increases as the position moves toward the D1 side from an end part 31*a* to an end part 31*b*. At the end part 31*b*, the flange 32 extends outward in the radial direction. The protrusion 33 is provided at the end part 31*a* of the body part 31. The protrusion 33 protrudes outward in the radial direction. The protrusion 33 is fitted to a groove 56 of an outer annular part 52 of an attachment member 5. Accordingly, the reflector 3 is attached to the attachment member 5. The reflector 3 is a reflection plate that reflects light from the LED 4 as a light source and guides the light to the liquid crystal panels 1 by reflection.

As illustrated in FIG. 2, the first holder 6 includes the attachment member 5, a heat sink 60, a circular disk member 71, the annular member 72, and a plurality of elongated members 73.

As illustrated in FIGS. 1 to 4, the attachment member 5 includes an inner annular part 51, the outer annular part 52, and a coupling part 54. The attachment member 5 is fastened to an end part of the elongated members 73 on the D1 side through a bolt. The inner annular part 51 is disposed on the D2 side in the attachment member 5, the outer annular part 52 is disposed on the D1 side in the attachment member 5, and the inner annular part 51 is integrated with the outer annular part 52 through the coupling part 54. A protrusion part 53 protruding outward in the radial direction is provided at the outer annular part 52. A through-hole 55 is provided at the protrusion part 53. The inner annular part 51 and the outer annular part 52 are disposed with an interval therebetween in the axial direction. Thus, the protrusion 33 is fitted between the inner annular part 51 and the outer annular part 52 by rotating the reflector 3 after the protrusion 33 of the reflector 3 is inserted into the groove 56 of the attachment member 5, and accordingly, the reflector 3 is attached to the attachment member 5 as described above. The reflector 3 is disposed on the D1 side of the attachment member 5, and the LED 4 is disposed on the D2 side of the attachment member 5. In other words, the attachment member 5 is disposed between the LED 4 and the reflector 3 in the axial direction.

The LED 4 is disposed on the D1 side of the heat sink 60. The LED 4 is disposed between the attachment member 5 and the heat sink 60. Specifically, the LED 4 is sandwiched and held by the attachment member 5 and the heat sink 60. The LED 4 is cooled by the heat sink 60.

The heat sink 60 is disposed on the D2 side of the attachment member 5. The heat sink 60 extends in the axial direction. The heat sink 60 includes a body part 61 and fins 62. The heat sink 60 is made of, for example, metal. The body part 61 is a cylinder body extending in the axial direction from an axial direction end 66 to an axial direction end 67. The axial direction end 66 contacts the LED 4. The fins 62 are provided on an outer peripheral surface 64 of the body part 61. The fins 62 protrude outward in the radial direction from the outer peripheral surface 64 of the body part 61. The fins 62 extend in the axial direction (first direction). The fins 62 are disposed at equal intervals in the circumferential direction on the entire outer peripheral surface 64 of the body part 61.

As illustrated in FIG. 2, the fins 62 include first fins 62A and second fins 62B. The first fins 62A have a first height H1 from the outer peripheral surface of the body part 61. The second fins 62B have a second height H2 from the outer peripheral surface of the body part 61. The second height H2 is less than the first height H1. The elongated members 73 are disposed outside the second fins 62B in the radial direction.

The circular disk member 71 includes through-holes 714, through-holes 711, concave grooves 712, and through-holes 713. A pair of through-holes 714 are provided on the inner side in the circular disk member 71 in the radial direction. The through-holes 714 of the circular disk member 71 correspond to bolt holes 68 of the heat sink 60. The circular disk member 71 is attached to the axial direction end 67 of the heat sink 60 by inserting and fastening bolts into the through-holes 714 and the bolt holes 68. The annular member 72 is provided on the outer periphery of the heat sink 60 and extends in the circumferential direction of the heat sink 60. The annular member 72 has a ring shape (annular shape) extending in the circumferential direction about the central axis AX.

Four elongated members 73 are assembled on the inner side of the annular member 72. Each elongated member 73 extends in the axial direction. The elongated member 73 extends in the axial direction outside the heat sink 60. A bolt hole 735 is provided at an axial direction end part 733 of the elongated member 73 on the D1 side, and a bolt hole is provided at an axial direction end part 734 of the elongated member 73 on the D2 side. A plurality of wall parts 736 are disposed at equal intervals in the axial direction outside the elongated member 73 in the radial direction. Recessed parts 732 that are recessed inward in the radial direction from an outer peripheral surface 731 are each provided between two wall parts 736 adjacent to each other in the axial direction.

The annular member 72 includes the annular body 721, the second convex parts 722 described above, and the protrusions 724. The annular body 721 is provided annularly in the circumferential direction about the central axis AX. The inner peripheral surface of the annular body 721 contacts outer ends 65 of the fins 62 in the radial direction. The second convex parts 722 protrude toward the D1 side from an end face of the annular body 721 on the D1 side. Each second convex part 722 elastically deforms in the radial direction around a root part with the annular body 721. Specifically, the second convex part 722 deforms inward in the radial direction when inward force in the radial direction is applied to the second convex part 722, and the second convex part 722 returns to the original position when the force applied to the second convex part 722 is removed. Extended parts 723 extend in the axial direction. The extended parts 723 are aligned with the second convex parts 722 in the circumferential direction. The extended parts 723 have a reinforcement function for the annular body 721.

Protrusion parts 725 protrude inward in the radial direction from the inner peripheral surface of the annular body 721. As illustrated in FIG. 3, the protrusion parts 725 are fitted to the recessed parts 732 of the elongated members 73. In other words, the protrusion parts 725 are externally fitted in contact with wall surfaces of the pair of wall parts 736 of the elongated members 73. Accordingly, positioning of the annular member 72 relative to the elongated members 73 in the axial direction is performed. As illustrated in FIG. 2, predetermined recessed parts among the recessed parts 732 are referred to as a first recessed part 732A and a second recessed part 732B. The second recessed part 732B is positioned on the D2 side of the first recessed part 732A. The distance between the LED 4 and the liquid crystal panels 1 in the axial direction when the protrusion parts 725 are fitted to the first recessed part 732A is referred to as a first distance. The distance between the LED 4 and the liquid crystal panels 1 in the axial direction when the protrusion parts 725 are fitted to the second recessed part 732B is referred to as a second distance. The first distance is longer than the second distance. As illustrated with dashed and double-dotted lines in FIG. 3, a through-hole 736*a* may be formed through a bottom part of each recessed part 732.

The bolt hole 735 provided at the axial direction end part 733 of each elongated member 73 on the D1 side corresponds to the through-hole 55 of the protrusion part 53 of the attachment member 5. The attachment member 5 is fastened to the elongated members 73 by aligning the bolt hole 735 and the through-hole 55 face-to-face and then inserting and fastened a bolt into the bolt hole 735 and the through-hole 55. The axial direction end part 734 that is an end part of the elongated member 73 on the D2 side is fitted to a concave groove 712 of the circular disk member 71. The circular disk member 71 is fastened to the elongated member 73 by inserting and fastening a bolt into a through-hole 713 and the bolt hole of the axial direction end part 734. Accordingly, the relative position of the elongated member 73 to the heat sink 60 in the axial direction is fixed.

The control board 8 is disposed on the D2 side of the first holder 6. The control board 8 includes a substrate 81 and a substrate 82. The substrate 81 and the substrate 82 each have a circular disk shape. The substrate 82 is positioned on the D1 side of the substrate 81. The substrate 81 and the substrate 82 are coupled to each other through three spacers 83. Three spacers 84 are attached on the D1 side of the substrate 82. The substrate 82 is attached to the circular disk member 71 by inserting and fitting distal end parts of the spacers 84 on the D1 side into the through-holes 711 of the circular disk member 71. The substrate 81 and the substrate 82 may be integrated as a single component. The substrate 81 controls the entire illumination device 100. The substrate 82 controls the liquid crystal panels 1. Specifically, as illustrated in FIG. 4, the liquid crystal panels 1 are electrically coupled to the substrate 82 through a flexible printed circuit board 400, and the orientation of liquid crystal molecules changes and the optical properties of the liquid crystal panels 1 change when voltage is applied to the liquid crystal panels 1. The flexible printed circuit board 400 will be described later in detail.

Figure 5:
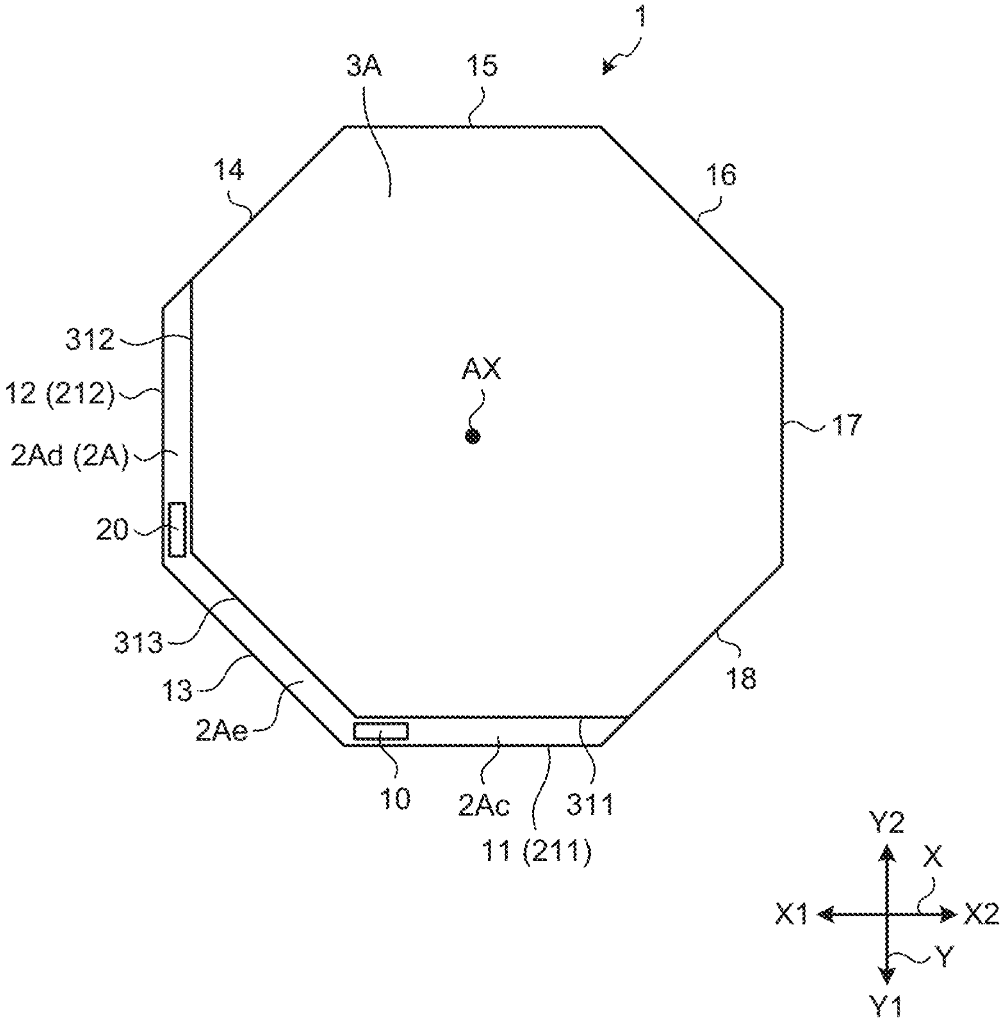
FIG. 5 is a schematic diagram of a liquid crystal panel when viewed from the front side.
Figure 6:
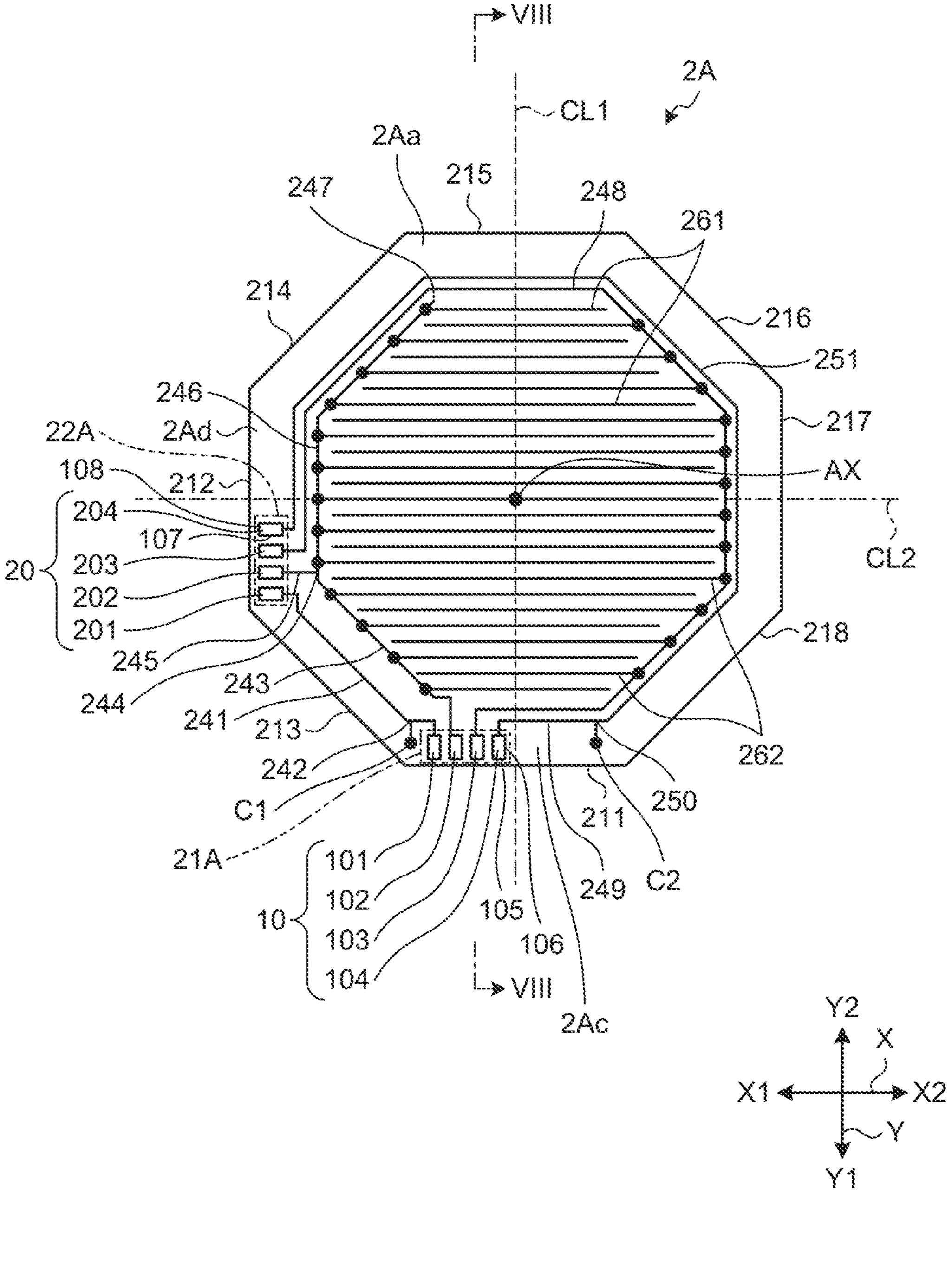
FIG. 6 is a schematic diagram illustrating the front surface of a first substrate included in the liquid crystal panel.
Figure 7:
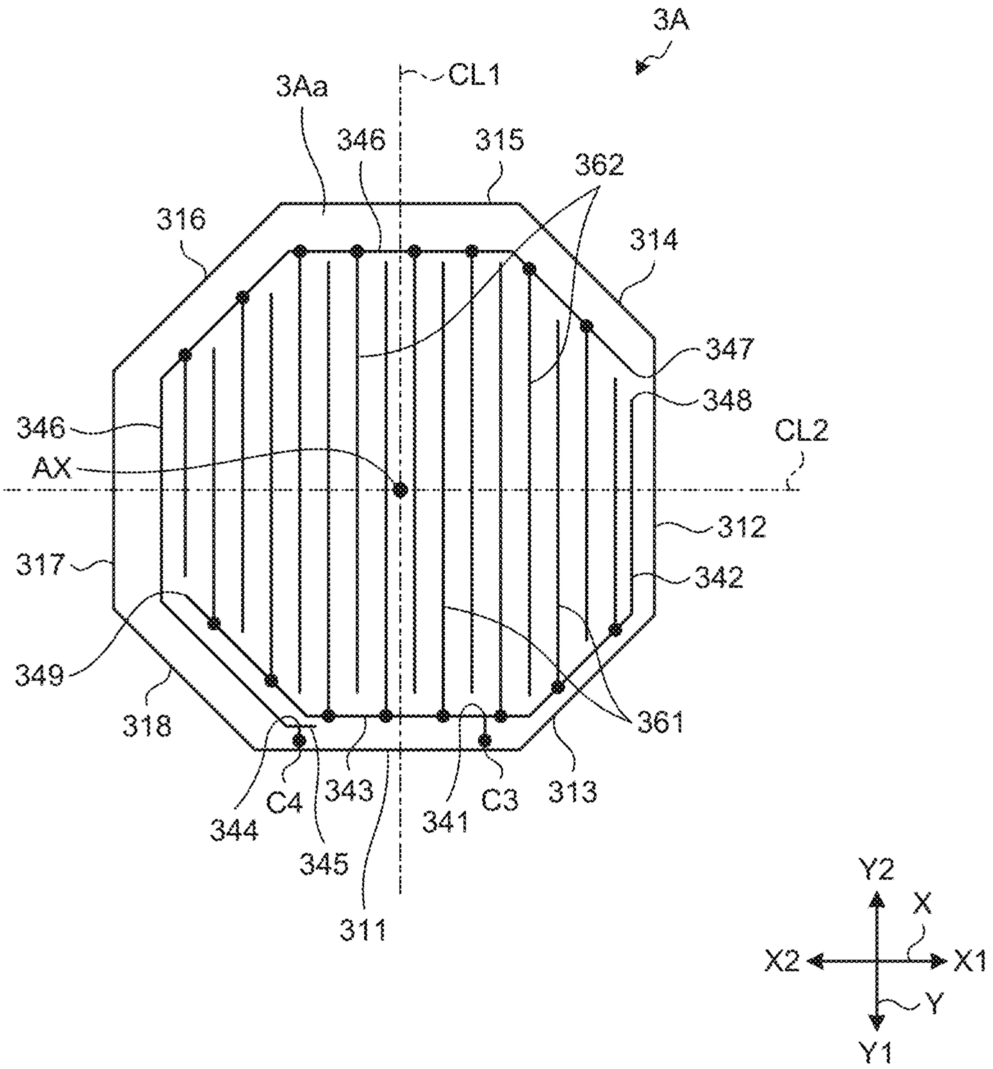
FIG. 7 is a schematic diagram of a second substrate included in the liquid crystal panel when turned over, illustrating its front surface on which wires are provided.
Figure 8:
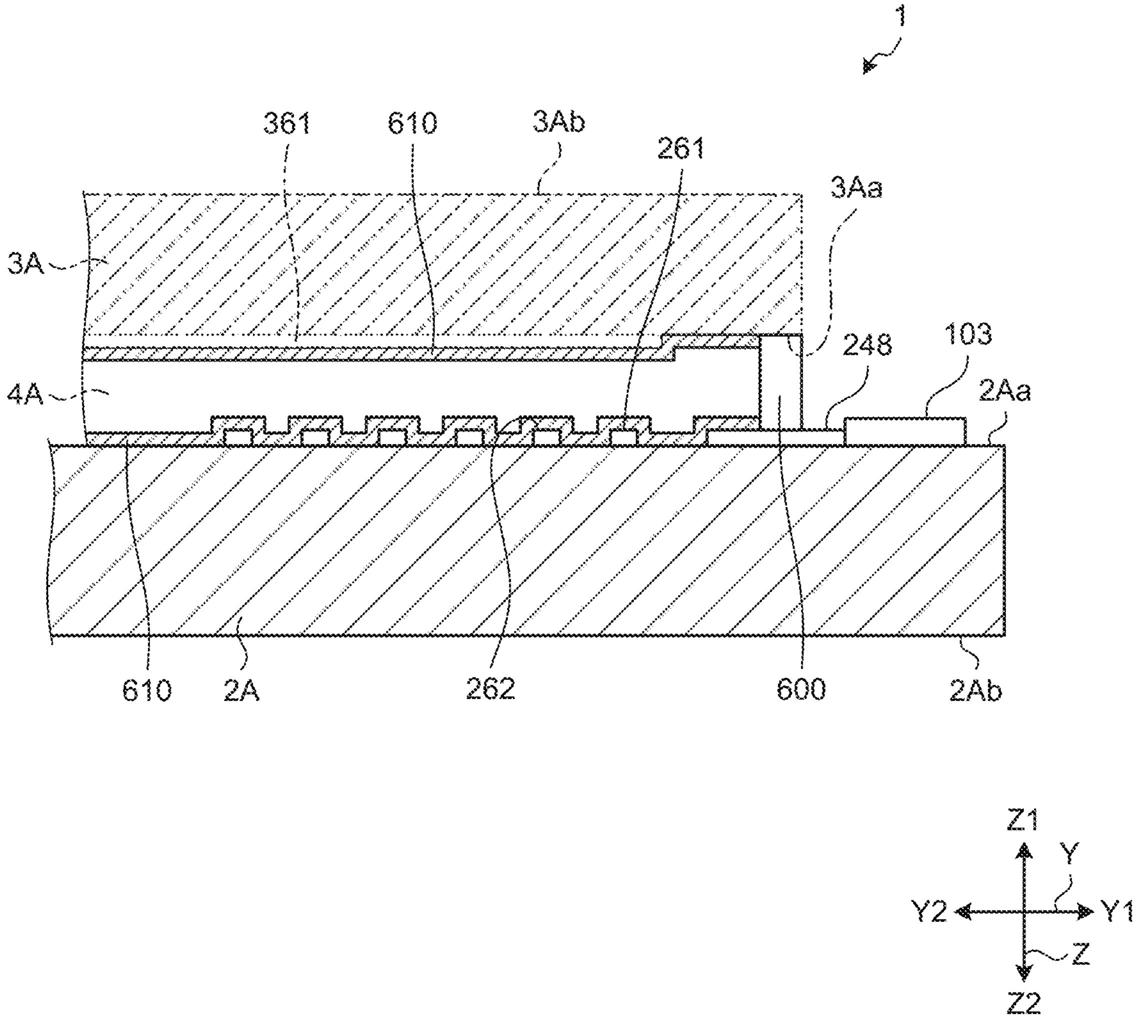
FIG. 8 is a sectional view along line VIII-VIII in FIG. 6.

The following describes the configuration of each liquid crystal panel 1. FIG. 5 is a schematic diagram of the liquid crystal panel when viewed from the front side. FIG. 6 is a schematic diagram illustrating the front surface of a first substrate included in the liquid crystal panel. FIG. 7 is a schematic diagram of a second substrate included in the liquid crystal panel when turned over, illustrating its front surface on which wires are provided. FIG. 8 is a sectional view along line VIII-VIII in FIG. 6. The front side of the liquid crystal panel 1 is the one side in the axial direction (the D1 side or the one side in the first direction), and the back side of the liquid crystal panel 1 is the other side in the axial direction (the D2 side or the other side in the first direction). In an XYZ coordinate system illustrated in FIGS. 5 to 8, the X direction is orthogonal to the Y direction. An X1 side is opposite an X2 side, and a Y1 side is opposite a Y2 side. The Z direction is orthogonal to the X and Y directions. A Z1 side is opposite a Z2 side. The Z direction coincides with the axial direction, the D direction, and the first direction. The Z1 side is the D1 side, and the Z2 side is the D2 side.

As illustrated in FIG. 5, each liquid crystal panel 1 includes a first substrate 2A, and a second substrate 3A disposed on the Z1 side of the first substrate 2A. The liquid crystal panel 1 is a regular octagon in plan view and has a first side 11, a second side 12, a third side 13, a fourth side 14, a fifth side 15, a sixth side 16, a seventh side 17, and an eighth side 18. In the present invention, the outer shape of the liquid crystal panel 1 is not particularly limited, and polygons other than octagons as well as circles and ellipses are included in the present invention. In the present embodiment, liquid crystal panels 1 stacked in the Z direction (axial direction) are the four liquid crystal panels 1 having the same configuration. However, two liquid crystal panels 1 adjacent to each other in the Z direction (axial direction) are stacked in states of being relatively rotated by 90° about the central axis AX that is a central part. Specifically, the four liquid crystal panels 1 are stacked as a liquid crystal panel for p-wave polarization, a liquid crystal panel for s-wave polarization, a liquid crystal panel for p-wave polarization, and a liquid crystal panel for s-wave polarization in this order in the Z direction (axial direction).

The first side 11 is positioned on the Y1 side on each liquid crystal panel 1. The first side 11 is parallel to the X direction in the drawing. The first side 11 of the liquid crystal panel 1 matches a first side 211 of the first substrate 2A illustrated in FIG. 6. However, a first side 311 of the second substrate 3A illustrated in FIG. 7 is positioned on the Y2 side beyond the first side 211 of the first substrate 2A. Thus, as illustrated in FIG. 6, an end part 2Ac of the first substrate 2A on the Y1 side is exposed when the second substrate 3A is stacked on the front side of the first substrate 2A. A first terminal group 10 is provided at the end part 2Ac.

The second side 12 is positioned on the X1 side on the liquid crystal panel 1. The second side 12 is parallel to the Y direction in the drawing. The second side 12 of the liquid crystal panel 1 matches a second side 212 of the first substrate 2A illustrated in FIG. 6. However, a second side 312 of the second substrate 3A illustrated in FIG. 7 is positioned on the X2 side beyond the second side 212 of the first substrate 2A. Thus, as illustrated in FIG. 5, an end part 2Ad of the first substrate 2A on the X1 side is exposed when the second substrate 3A is stacked on the front side of the first substrate 2A. A second terminal group 20 is provided at the end part 2Ad.

The third side 13 intersects both the X1 direction and the Y1 direction. The angle of the intersection is 45°. The third side 13 matches a third side 213 of the first substrate 2A illustrated in FIG. 6. However, a third side 313 of the second substrate 3A illustrated in FIG. 7 is positioned on the X2 and Y2 sides beyond the third side 213 of the first substrate 2A. In other words, in plan view, the third side 313 of the second substrate 3A is positioned on the center side relative to the third side 213 of the first substrate 2A. Thus, as illustrated in FIG. 5, an end part 2Ae of the first substrate 2A is exposed when the second substrate 3A is stacked on the front side of the first substrate 2A.

The fourth side 14 intersects both the X1 direction and the Y2 direction. The angle of the intersection is 45°. The fourth side 14 overlaps a fourth side 214 of the first substrate 2A illustrated in FIG. 6 and a fourth side 314 of the second substrate 3A illustrated in FIG. 7.

The fifth side 15 is positioned on the Y2 side on the liquid crystal panel 1. The fifth side 15 overlaps a fifth side 215 of the first substrate 2A illustrated in FIG. 6 and a fifth side 315 of the second substrate 3A illustrated in FIG. 8.

The sixth side 16 intersects both the X2 direction and the Y2 direction. The angle of the intersection is 45°. A sixth side 164 overlaps a sixth side 216 of the first substrate 2A illustrated in FIG. 6 and a sixth side 316 of the second substrate 3A illustrated in FIG. 7.

The seventh side 17 is positioned on the X2 side on the liquid crystal panel 1. The seventh side 17 overlaps a seventh side 217 of the first substrate 2A illustrated in FIG. 6 and a seventh side 317 of the second substrate 3A illustrated in FIG. 7.

The eighth side 18 intersects both the X2 direction and the Y1 direction. The angle of the intersection is 45°. The eighth side 18 overlaps an eighth side 218 of the first substrate 2A illustrated in FIG. 6 and an eighth side 318 of the second substrate 3A illustrated in FIG. 7.

Accordingly, the area of the second substrate 3A is smaller than the area of the first substrate 2A, and thus, the first terminal group 10 provided at the end part 2Ac of the first substrate 2A and the second terminal group 20 provided at the end part 2Ad thereof are exposed. The first terminal group 10 or the second terminal group 20 is electrically coupled to the flexible printed circuit board 400.

The following describes the first substrate 2A and the second substrate 3A with reference to FIGS. 6 and 7. FIG. 7 is a schematic diagram illustrating a front surface 3Aa on which wires are provided among the front and back surfaces of the second substrate 3A. Accordingly, the X1 and X2 directions of the second substrate 3A in FIG. 7 are opposite the X1 and X2 directions of the first substrate 2A in FIG. 6. FIG. 6 illustrates a central line CL1 extending in the Y direction through the center of the first substrate 2A in the X direction, and a central line CL2 extending in the X direction through the center of the first substrate 2A in the Y direction.

As illustrated in FIG. 6, at the end part 2Ac along the first side 211 of the first substrate 2A, the first terminal group 10 is provided at a first end part 21A (illustrated with dashed and double-dotted lines) on a side closer to the second side 212 (or side closer to the third side 213) with respect to the center of the first side 211. In other words, the end part 2Ac is an end part of the first substrate 2A on the Y1 side, and the first end part 21A illustrated with dashed and double-dotted lines is disposed on the X1 side beyond the central line CL1 among sites of the end part 2Ac. The first terminal group 10 is provided at the first end part 21A. As illustrated in FIG. 6, the first terminal group 10 includes a first terminal 101, a second terminal 102, a third terminal 103, and a fourth terminal 104. The first terminal 101, the second terminal 102, the third terminal 103, and the fourth terminal 104 are sequentially arranged in the X direction from the X1 side toward the X2 side. The terminals 101, 102, 103, and 104 each have a pair of short sides 105 parallel to the first side 211 and a pair of long sides 106 parallel to the second side 212.

As illustrated in FIG. 6, at the end part 2Ad along the second side 212 of the first substrate 2A, the second terminal group 20 is provided at a second end part 22A (illustrated with dashed and double-dotted lines) on a side closer to the first side 211 (or side closer to the third side 213) with respect to the center of the second side 212. In other words, the end part 2Ad is an end part of the first substrate 2A on the X1 side, and the second end part 22A illustrated with dashed and double-dotted lines is disposed on the Y1 side beyond the central line CL2 among sites of the end part 2Ad. The second terminal group 20 is provided at the second end part 22A. As illustrated in FIG. 6, the second terminal group 20 includes a fifth terminal 201, a sixth terminal 202, a seventh terminal 203, and an eighth terminal 204. The fifth terminal 201, the sixth terminal 202, the seventh terminal 203, and the eighth terminal 204 are sequentially arranged in the front-back direction (Y direction) from the Y1 side toward the Y2 side. The terminals 201, 202, 203, and 204 each have a pair of long sides 107 parallel to the first side 211 and a pair of short sides 108 parallel to the second side 212.

The following describes wires on the first substrate 2A and the second substrate 3A. Wires are provided on the front surface of each substrate among the front and back surfaces thereof. In other words, a surface on which wires are provided is referred to as the front surface, and a surface opposite to the front surface is referred to as the back surface.

As illustrated in FIG. 6, wires, liquid crystal drive electrodes, and couplers are provided on a front surface 2Aa of the first substrate 2A. A coupler C1 of the first substrate 2A and a coupler C3 (refer to FIG. 7) of the second substrate 3A are electrically coupled to each other through a conductive pole (not illustrated) through which conduction is possible. Similarly, a coupler C2 of the first substrate 2A and a coupler C4 (refer to FIG. 7) of the second substrate 3A are electrically coupled to each other through a common electrode (not illustrated) through which conduction is possible.

The first terminal 101 and the fifth terminal 201 are electrically coupled to each other through a wire 241. A bifurcation point 242 is provided halfway through the wire 241, and a wire extends from the bifurcation point 242 to the coupler C1.

The second terminal 102 and the sixth terminal 202 are electrically coupled to each other through wires 243 and 245. A bifurcation point 244 is provided on the wire 243, and a wire 246 extends from the bifurcation point 244 to an end 247.

The third terminal 103 and the seventh terminal 203 are electrically coupled to each other through a wire 248. The fourth terminal 104 and the eighth terminal 204 are electrically coupled to each other through wires 249 and 251. The wire 249 extends up to a bifurcation point 250 from the fourth terminal 104 toward the X2 side. The wire 251 extends from the bifurcation point 250 to the eighth terminal 204. A wire extends from the bifurcation point 250 to the coupling portion C2.

A plurality of liquid crystal drive electrodes 261 are coupled to the wires 243 and 246. The liquid crystal drive electrodes 261 extend straight in the X direction. The liquid crystal drive electrodes 261 are disposed at equal intervals in the Y direction.

A plurality of liquid crystal drive electrodes 262 are coupled to the wire 248. The liquid crystal drive electrodes 262 extend straight in the X direction. The liquid crystal drive electrodes 262 are disposed at equal intervals in the Y direction. The liquid crystal drive electrodes 261 and 262 are alternately arranged in the Y direction.

As illustrated in FIG. 7, wires, liquid crystal drive electrodes, and couplers are provided on the front surface 3Aa of the second substrate 3A. The central lines CL1 and CL2 illustrated in FIG. 7 correspond to the central lines CL1 and CL2 illustrated in FIG. 6.

The coupling portion C3 is coupled to wires 342 and 343 through a bifurcation point 341. The wire 342 extends to an end 348. The wire 343 extends to an end 349. The coupling portion C4 is coupled to wires 345 and 346 through a bifurcation point 344. The wire 346 extends to an end 347.

A plurality of liquid crystal drive electrodes 361 are coupled to the wires 342 and 343. The liquid crystal drive electrodes 361 extend straight in the Y direction. The liquid crystal drive electrodes 361 are disposed at equal intervals in the X direction.

A plurality of liquid crystal drive electrodes 362 are coupled to the wire 346. The liquid crystal drive electrodes 362 extend straight in the Y direction. The liquid crystal drive electrodes 362 are disposed at equal intervals in the X direction. The liquid crystal drive electrodes 361 and 362 are alternately arranged in the X direction.

The following briefly describes a sectional structure of each liquid crystal panel 1. As illustrated in FIG. 8, the liquid crystal panel 1 includes the first substrate 2A, the second substrate 3A, and a liquid crystal layer 4A. As illustrated in FIG. 8, the second substrate 3A is disposed on the front side (Z1 side) of the first substrate 2A. The liquid crystal layer 4A is provided between the second substrate 3A and the first substrate 2A. Specifically, the front surface 2Aa of the first substrate 2A and the front surface 3Aa of the second substrate 3A face each other with the liquid crystal layer 4A interposed therebetween. The first substrate 2A has a back surface 2Ab opposite the front surface 2Aa, and the second substrate 3A has a back surface 3Ab opposite the front surface 3Aa. Since the area of the second substrate 3A is smaller than the area of the first substrate 2A as described above, the third terminal 103 provided on the front surface 2Aa of the first substrate 2A is exposed. An insulating layer, which is provided to prevent contact between two wires, is not provided in the liquid crystal panel 1 according to the present embodiment because no wires on the first substrate 2A overlap each other.

In addition, alignment films 610 are stacked on both substrates and the electrodes as illustrated in FIG. 8. Specifically, one of the alignment films 610 is stacked on the front surface 2Aa of the first substrate 2A and the upper surfaces of the liquid crystal drive electrodes 261 and 262, and part of the wire 248. The other alignment film 610 is stacked on the front surface 3Aa of the second substrate 3A and the upper surface of the liquid crystal drive electrode 361. The first substrate 2A and the second substrate 3A are bonded to each other by a seal 600 enclosing an effective region, and the liquid crystal layer 4A fills a space formed by the seal 600.

The following briefly describes effects of each liquid crystal panel 1. For example, when voltage is applied to the liquid crystal panel 1, the alignment state of liquid crystal molecules in the liquid crystal layer 4A illustrated in FIG. 8 changes, which changes refractive index distribution, thereby allowing transmission of transmitted light. In FIG. 6, light diffuses in the Y direction when current flows to the liquid crystal drive electrodes 261 and 262 extending in the X direction to provide potential difference between the liquid crystal drive electrodes 261 and 262. In FIG. 7, light diffuses in the X direction when current flows to the liquid crystal drive electrodes 361 and 362 extending in the Y direction to provide potential difference between the liquid crystal drive electrodes 361 and 362. Light diffuses in the X and Y directions by providing the potential difference between the liquid crystal drive electrodes 261 and 262 and the potential difference between the liquid crystal drive electrodes 361 and 362. The degree of light diffusion in the Y direction relative to the X direction can be changed by increasing or decreasing the potential difference between the liquid crystal drive electrodes 261 and 262. In addition, the degree of light diffusion in the X direction relative to the Y direction can be changed by increasing or decreasing the potential difference between the liquid crystal drive electrodes 361 and 362. Accordingly, with the optical element 1A formed by stacking liquid crystal panels, it is possible to form a light distribution state elongated in the X direction and a light distribution state elongated in the Y direction and also form a light distribution state of an elliptical shape that is long in the X or Y direction.

Figure 9A:
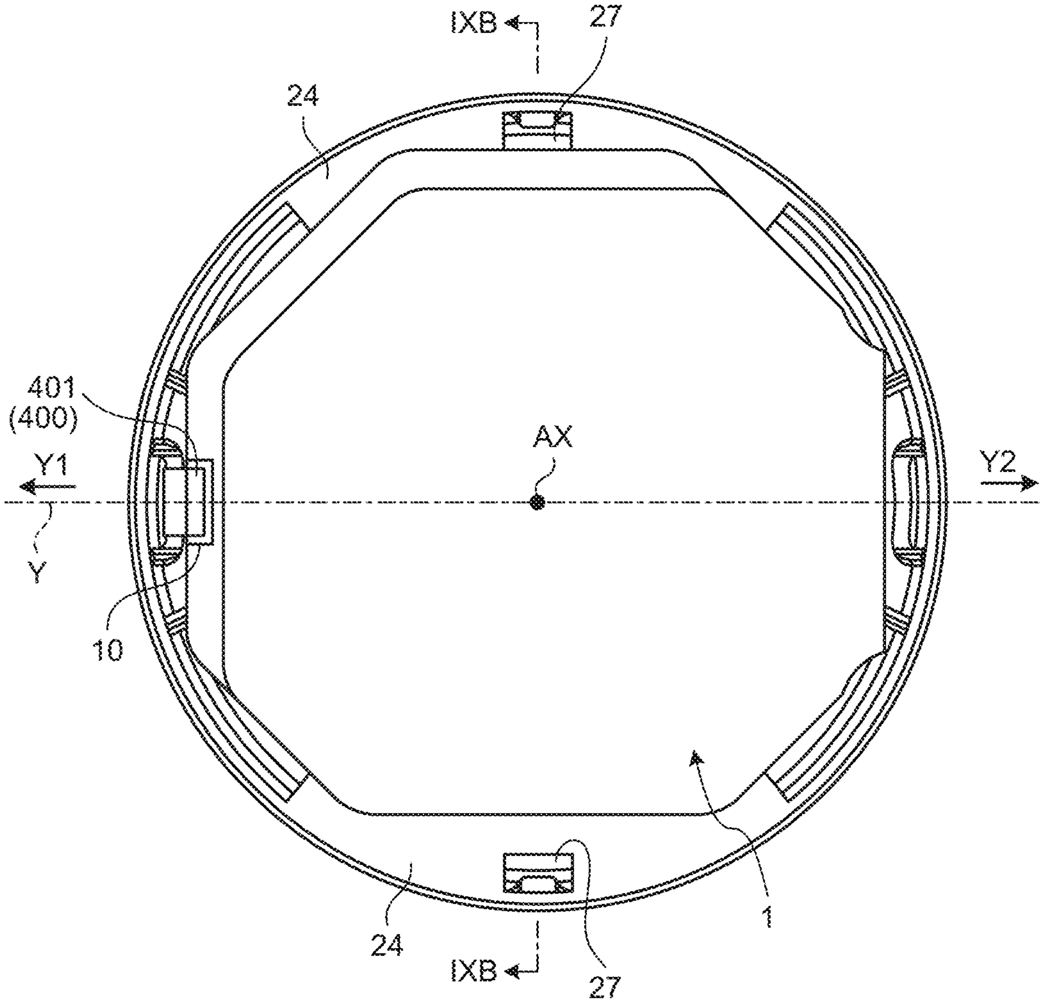
FIG. 9A is a schematic front view of part of FIG. 4 when viewed from a D1 side.
Figure 9B:
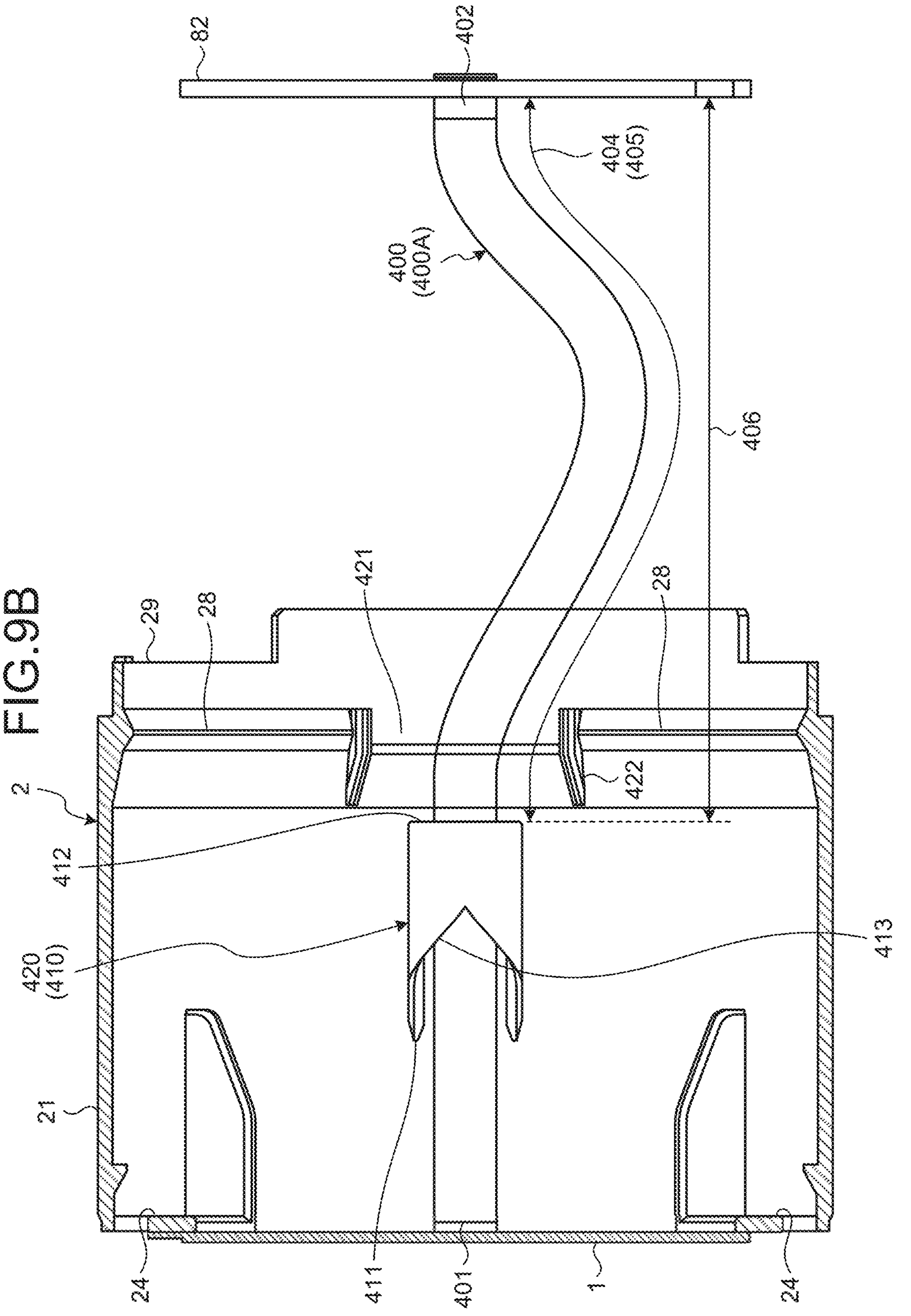
FIG. 9B is a schematic sectional view along line IXB-IXB in FIG. 9A.
Figure 9C:
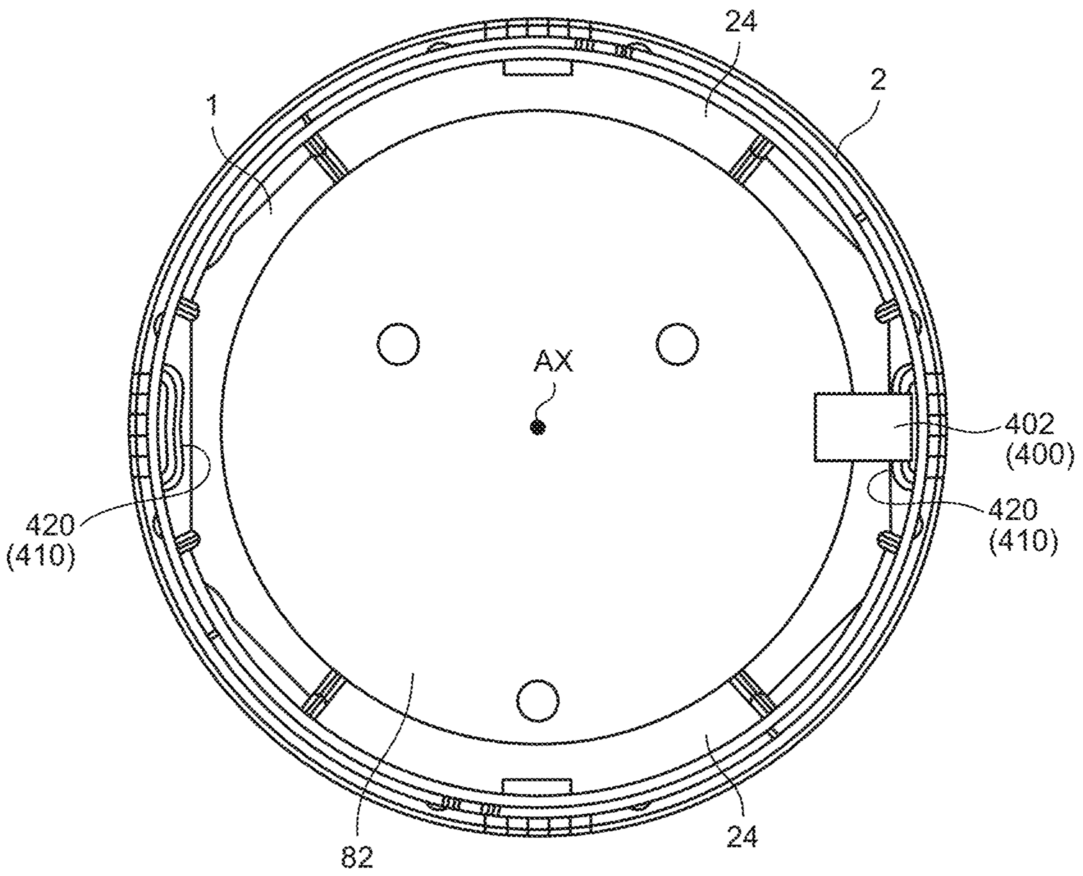
FIG. 9C is a schematic back view of FIG. 9B when viewed from a D2 side.
Figure 10A:
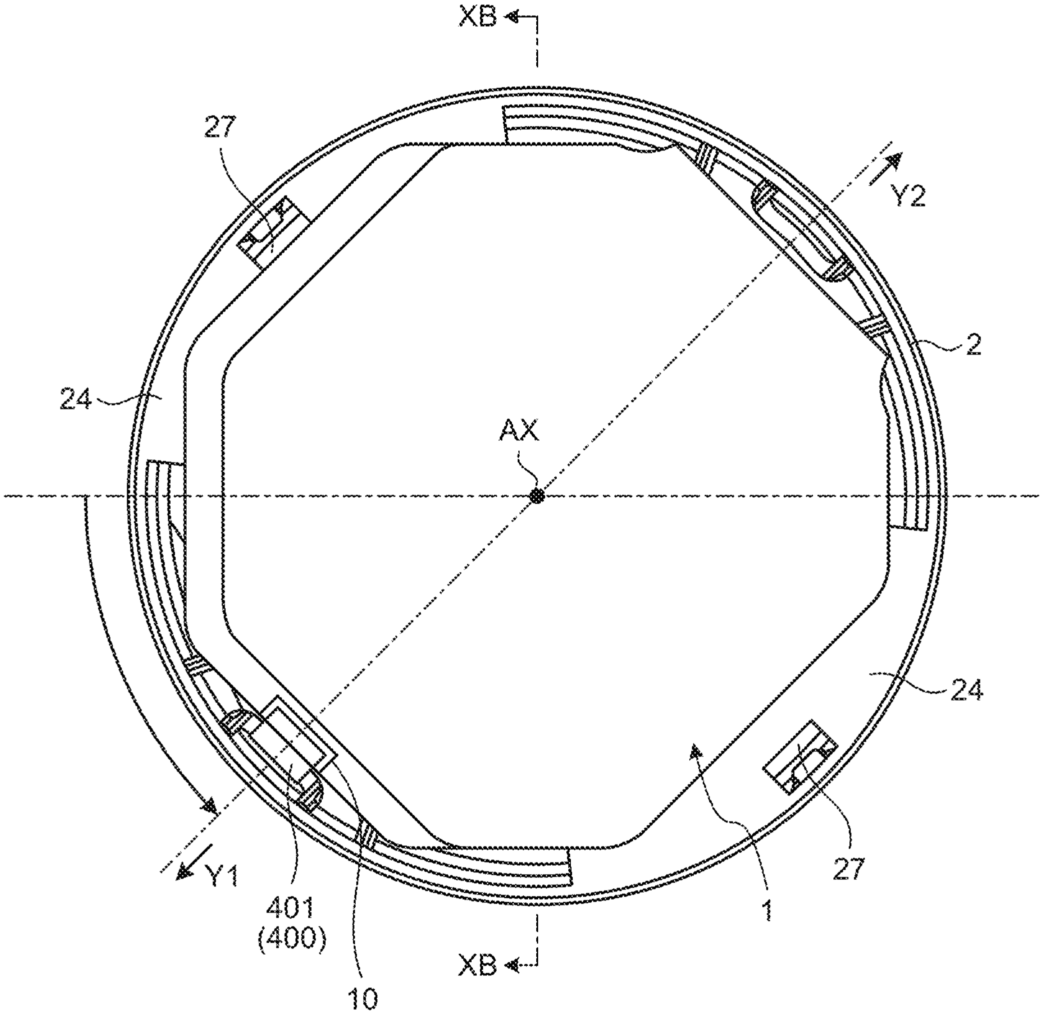
FIG. 10A is a schematic front view of part of FIG. 4 when viewed from the D1 side, illustrating a liquid crystal panel and a second holder in a state of being rotated by 45° relative to the state of FIG. 9A.
Figure 10B:
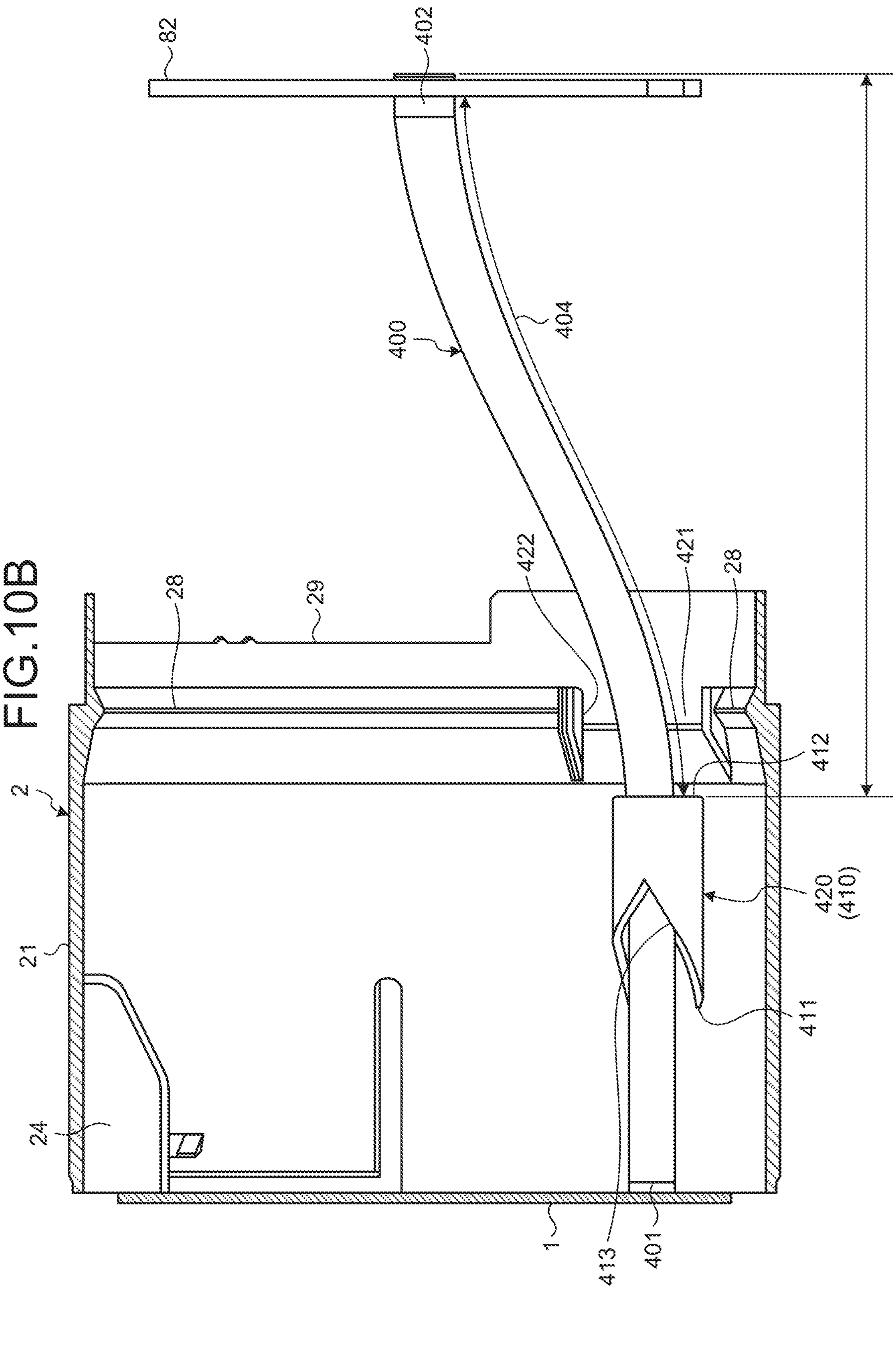
FIG. 10B is a schematic sectional view along line XB-XB in FIG. 10A.
Figure 10C:
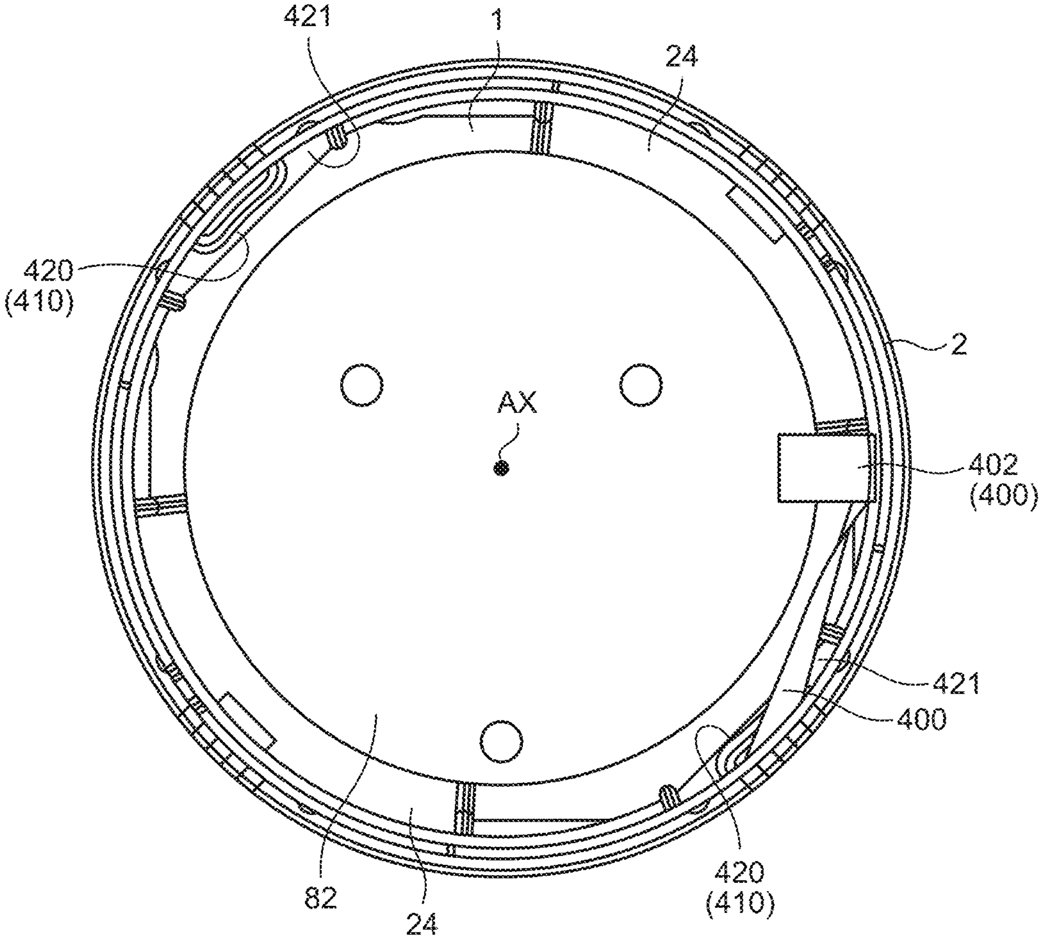
FIG. 10C is a schematic back view of FIG. 10B when viewed from the D2 side.

FIG. 9A is a schematic front view of part of FIG. 4 when viewed from the D1 side. FIG. 9B is a schematic sectional view along line IXB-IXB in FIG. 9A. FIG. 9C is a schematic back view of FIG. 9B when viewed from the D2 side. FIG. 10A is a schematic front view of part of FIG. 4 when viewed from the D1 side, illustrating a liquid crystal panel and the second holder 2 in a state of being rotated by 45° relative to the state of FIG. 9A. FIG. 10B is a schematic sectional view along line XB-XB in FIG. 10A. FIG. 10C is a schematic back view of FIG. 10B when viewed from the D2 side. FIGS. 9A to 10C illustrate part of FIG. 4. Specifically, FIGS. 9A to 10C illustrate a liquid crystal panel 1 closest to the D2 side among the four liquid crystal panels 1, the second holder 2, and the substrate 82. The liquid crystal panel 1 and the second holder 2 integrally rotate, but the substrate 82 does not rotate. In other words, the liquid crystal panel 1 and the second holder 2 rotate relative to the substrate 82.

FIGS. 9A to 9C illustrate a state before the liquid crystal panel 1 and the second holder 2 rotate, and FIGS. 10A to 10C illustrate a state after the liquid crystal panel 1 and the second holder 2 rotate. The following, first, describes the state before the liquid crystal panel 1 and the second holder 2 rotate.

As illustrated in FIG. 9B, a wire support part 410 supporting part of the flexible printed circuit board 400 is provided on the inner surface of the coupling part 21 of the second holder 2. Specifically, as illustrated in FIG. 9C, the wire support part 410 is an insertion part 420 with a through-hole penetrating in the axial direction (first direction). The insertion part 420 has a flat shape along the inner surface of the coupling part 21 when viewed in the axial direction. The flexible printed circuit board 400 penetrates through the through-hole inside the insertion part 420.

In other words, the insertion part 420 is a tubular body extending in the axial direction (first direction) as illustrated in FIG. 9B. A cutout groove 413 in a V shape is provided on the D1 side in the insertion part 420.

As illustrated in FIG. 9B, the first convex part 28 is erected inward in the radial direction on the D2 side of the insertion part 420. The first convex part 28 extends in the circumferential direction. A cutout part 421 through which the flexible printed circuit board 400 can pass is provided at part of the first convex part 28 in the circumferential direction. The cutout part 421 and the insertion part 420 overlap each other when viewed in the axial direction. A guide part 422 is erected at an end part of the first convex part 28 facing the cutout part 421. Two guide parts 422 are provided at one cutout part 421. The two guide parts 422 each have a height that gradually decreases as the position moves toward the D1 side. The first convex part 28 continuously connects two cutout parts 421 adjacent to each other in the circumferential direction. The length of the first convex part 28 in the circumferential direction is at least a length with which the second holder 2 can rotate by 45°. In other words, since the tilted surface 28*a* of the first convex part 28 of the second holder slides relative to the tilted surfaces 722*b* of the second convex parts 722 of the first holder as described above, the length of the first convex part 28 in the circumferential direction is equal to or longer than a quarter of the entire circumference of the inner surface of the coupling part 21.

The flexible printed circuit board 400 (wire 400A) extends in the axial direction (first direction). Specifically, as illustrated in FIG. 9A, a one end part 401 of the flexible printed circuit board 400 on the D1 side is joined and electrically coupled to the first terminal group 10 of the liquid crystal panel 1 through, for example, an anisotropic conductive adhesive. The anisotropic conductive adhesive may be, for example, an anisotropic conductive film (ACF) or anisotropic conductive paste (ACP). As illustrated in FIG. 9B, an intermediate part (a portion) of the flexible printed circuit board 400 is supported by the insertion part 420 as described above. As illustrated in FIG. 9C, the other end part 402 of the flexible printed circuit board 400 on the D2 side is electrically coupled to a terminal part of the substrate 82.

As illustrated in FIG. 9B, a part of the flexible printed circuit board 400 from the insertion part 420 to the substrate 82 is referred to as a first part 404. The length of the first part 404 is referred to as a first length 405. The length of the insertion part 420 and the substrate 82 in the axial direction is referred to as a second length 406. The first length 405 is longer than the second length 406. In other words, the first part 404 is sagging downward. The first part 404 extends through a cutout part 421.

The following describes the state after the liquid crystal panel 1 and the second holder 2 rotate. Comparison of FIG. 10A with FIG. 9A reveals that the liquid crystal panel 1 and the second holder 2 rotate by 45° in the anticlockwise direction (leftward direction) about the central axis AX as indicated by the arrow in FIG. 10A. Accordingly, as illustrated in FIG. 10B, a part of the flexible printed circuit board 400 from the one end part 401 to the insertion part 420 rotates together with the liquid crystal panel 1 and the second holder 2. Since the substrate 82 does not rotate, the first part 404 of the flexible printed circuit board 400 transitions from the sagging state illustrated in FIG. 9B to a stretched state as illustrated in FIG. 10B. Even when part of the flexible printed circuit board 400 moves in the circumferential direction during rotation, damage on the flexible printed circuit board 400 is prevented because the flexible printed circuit board 400 contacts the guide part 422.

The following describes a light distribution pattern. As described above, the four liquid crystal panels 1 each include the liquid crystal drive electrodes 261 and 262 extending in the X direction and arranged in the Y direction and the liquid crystal drive electrodes 361 and 362 extending in the Y direction and arranged in the X direction. The liquid crystal panels 1 are stacked with the second, third, and fourth liquid crystal panels 1 being rotated by 180°, 90°, and 270°, respectively, relative to the first liquid crystal panel 1 positioned on the light source side. By controlling the potential of each of the liquid crystal drive electrodes 261 and 262 and the liquid crystal drive electrodes 361 and 362, it is possible to control the light distribution pattern to an elliptical shape with a long axis along the X axis or an elliptical shape with a long axis along the Y axis. Moreover, in the present embodiment, by rotating the four liquid crystal panels 1 about the central axis AX, it is possible to control the light distribution pattern to, for example, an elliptical shape with a long axis rotated by 45° relative to the X axis or the Y axis. Specific description is given below.

Figure 11:
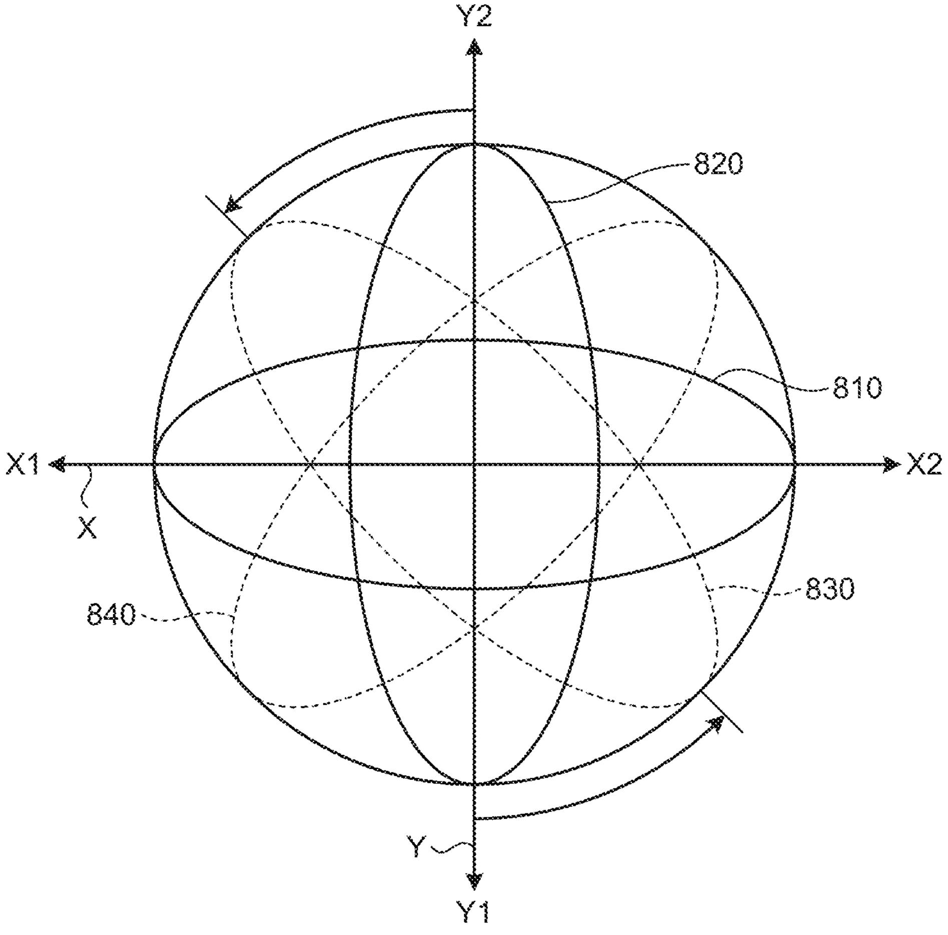
FIG. 11 is a schematic diagram illustrating examples of a light distribution pattern.

FIG. 11 is a schematic diagram illustrating examples of the light distribution pattern. A first light distribution pattern 810 is the light distribution pattern in an elliptical shape with a long axis along the X axis. This is, for example, the light distribution pattern when viewed from the D1 side in a case where, in some or all of the four liquid crystal panels 1, the potential difference between adjacent electrodes among a plurality of electrodes extending in the X direction and arranged in the Y direction is 0 volt (V) and the potential difference between adjacent electrodes among a plurality of electrodes extending in the Y direction and arranged in the X direction exceeds 0 volt (V).

A second light distribution pattern 820 is the light distribution pattern in an elliptical shape with a long axis along the Y axis. This is, for example, the light distribution pattern when viewed from the D1 side in a case where, in some or all of the four liquid crystal panels 1, the potential difference between adjacent electrodes among a plurality of electrodes extending in the X direction and arranged in the Y direction exceeds 0 volt (V) and the potential difference between electrodes among a plurality of adjacent electrodes extending in the Y direction and arranged in the X direction is 0 volt (V).

A third light distribution pattern 830 is the light distribution pattern in an elliptical shape with a long axis tilted by 45° in the anticlockwise (leftward direction) relative to the Y axis. This is obtained by, for example, rotating all the four liquid crystal panels 1 by 45° in the anticlockwise (leftward direction) about the central axis AX from the state of the second light distribution pattern 820.

A fourth light distribution pattern 840 is the light distribution pattern in an elliptical shape with a long axis tilted by 45° in the anticlockwise (leftward direction) relative to the X axis. This is obtained by, for example, rotating all the four liquid crystal panels 1 by 45° in the anticlockwise (leftward direction) about the central axis AX from the state of the first light distribution pattern 810. In the present embodiment, as illustrated in FIGS. 9A to 10A, rotation is made by 45° in the anticlockwise (leftward direction). In a case where FIG. 9A illustrates, for example, the second light distribution pattern 820, FIG. 10A illustrates the third light distribution pattern 830. Thus, in the present embodiment, the light distribution pattern can be changed from the second light distribution pattern 820 to the third light distribution pattern 830.

As described above, the illumination device 100 in the present embodiment includes the LED 4, the liquid crystal panels 1 disposed on the D1 side of the LED 4, the first holder 6 having the central axis AX extending in the axial direction and holding the LED 4, the second holder 2, the substrate 82 disposed on the D2 side of the first holder 6 and configured to control the liquid crystal panels 1, and the wire 400A extending in the axial direction and electrically coupling the liquid crystal panels 1 and the substrate 82. The second holder 2 includes the first convex part 28 provided on the outer peripheral side of the first holder 6 and supporting the first holder 6 rotatably in the circumferential direction about the central axis AX, the panel holding cover 22 holding the liquid crystal panels 1, and the coupling part 21 coupling the first convex part 28 and the panel holding cover 22. The second holder 2 includes the wire support part 410 supporting part of the wire 400A.

As described above, in the illumination device of JP-A-2013-48029, the orientation of the LED relative to the base is changed by bending the tubular member relative to the axial direction. In the illumination device of JP-A-2015-97189, the light distribution angle of the illumination device is converted to an omnidirectional type or a downward type by changing the length of the coupling member to change the distance between the base and the LED in the axial direction. However, there has conventionally been no illumination device that rotates the light distribution pattern about the axial center.

In the present embodiment, the second holder 2 holding the liquid crystal panels 1 is rotatable relative to the first holder 6 in the circumferential direction about the central axis AX. Thus, in a case where the light distribution pattern is elongated in one direction (for example, longitudinal direction or lateral direction), the light distribution pattern can be rotated about the central axis AX to provide a variety of light distribution patterns. For example, as described above with reference to FIG. 11, the second light distribution pattern 820 in an elliptical shape that is long along the Y axis can be changed to the third light distribution pattern 830 through rotation by 45° in the anticlockwise direction.

The second holder 2 includes the wire support part 410 supporting part of the flexible printed circuit board 400 as an example of the wire 400A. In a case where the liquid crystal panels 1 and the second holder 2 are rotated relative to the first holder 6 while the substrate 82 is not rotated, torsion of part of the flexible printed circuit board 400 from the liquid crystal panels 1 to the wire support part 410 is prevented since the flexible printed circuit board 400 rotates together with the second holder 2. Accordingly, torsional force due to rotation of the second holder 2 is less likely to be input to a joining part of the liquid crystal panels 1 to the flexible printed circuit board 400, damage on the joining part is reduced, and accordingly, the flexible printed circuit board 400 is less likely to detach from the liquid crystal panels 1.

The rotation support part of the second holder 2 includes the first convex part 28 and the end part 29 (fitting part). The second convex parts 722 and the protrusions 724 (fitting counterpart) that are slidable relative to the fitting part in the circumferential direction in a state of being fitted to the fitting part are provided on the outer peripheral surface of the first holder 6. Accordingly, the second holder 2 is less likely to detach from the first holder 6, and the second holder 2 can be smoothly rotated relative to the first holder 6.

The fitting part includes the first convex part 28 protruding inward in the radial direction. The fitting counterpart includes the second convex parts 722 protruding outward in the radial direction and being slidable relative to the first convex part 28.

In this manner, the second holder 2 can be smoothly rotated relative to the first holder 6 with such a simple configuration of the first convex part 28 and the second convex parts 722.

The wire 400A is the flexible printed circuit board 400. The wire support part 410 is the insertion part 420 provided on the inner surface of the second holder 2 and the flexible printed circuit board 400 passes inside the insertion part 420. In this manner, the wire support part 410 can be provided with such a simple configuration of the insertion part 420.

The insertion part 420 is a tubular body extending in the axial direction. In this manner, since the insertion part 420 is a tubular body extending in the axial direction, it is possible to more stably support the flexible printed circuit board 400 even when the flexible printed circuit board 400 moves in the circumferential direction during rotation of the second holder 2.

The insertion part 420 is disposed on the D1 side of the second convex parts 722. The first convex part 28 extends in the circumferential direction, and the cutout part 421 through which the wire 400A can pass is provided at part of the first convex part 28 in the circumferential direction. The cutout part 421 and the insertion part 420 overlap when viewed in the axial direction.

Accordingly, having penetrated through the insertion part 420, the flexible printed circuit board 400 extends in the axial direction to the substrate 82 through the cutout part 421. Thus, the flexible printed circuit board 400 can be disposed along the inner surface of the second holder 2.

The first length 405 of the first part 404 of the flexible printed circuit board 400 from the insertion part 420 to the substrate 82 is longer than the second length 406 of the insertion part 420 and the substrate 82 in the axial direction. In other words, the first part 404 is sagging downward. With this configuration, the first part 404 is less likely to receive tension when the first part 404 is stretched as the second holder 2 is rotated, and damage on the flexible printed circuit board 400 can be prevented.

Second Embodiment

Figure 12:
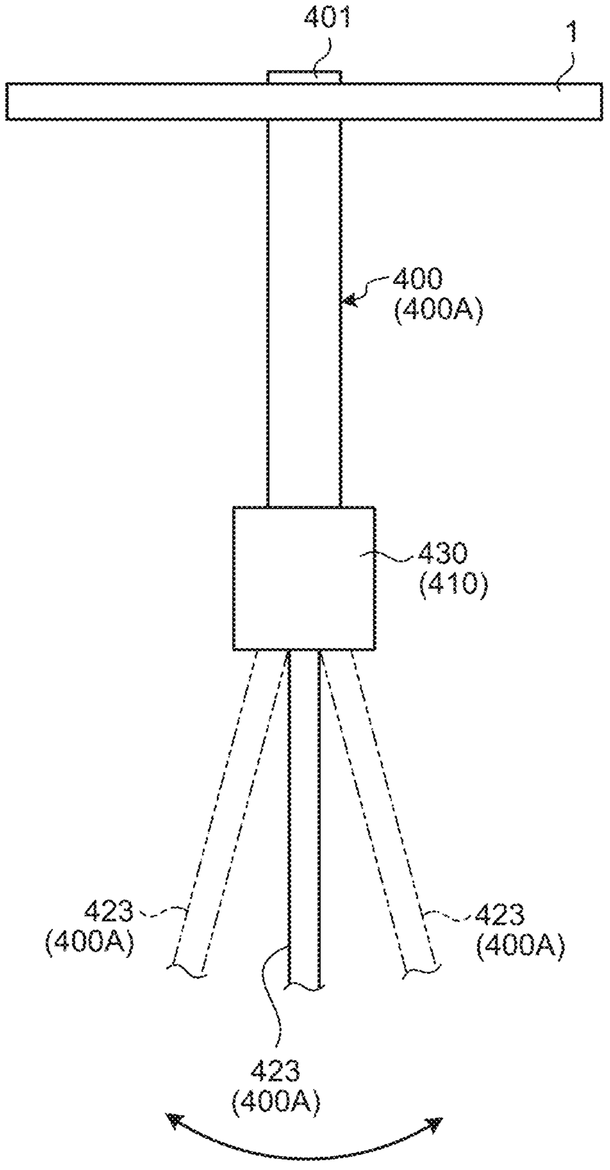
FIG. 12 is a schematic diagram illustrating part of an illumination device according to a second embodiment.
Figure 13:
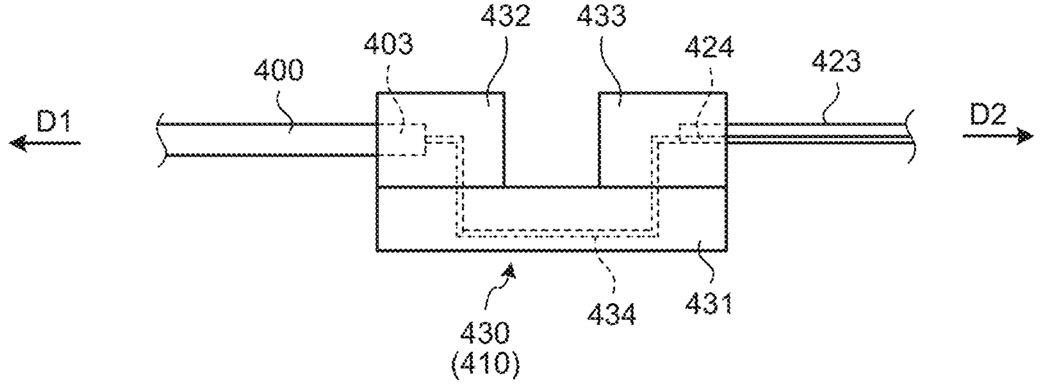
FIG. 13 is a schematic diagram illustrating a relay connector in FIG. 12.

The following describes a second embodiment. FIG. 12 is a schematic diagram illustrating part of an illumination device according to the second embodiment. FIG. 13 is a schematic diagram illustrating a relay connector in FIG. 12.

The wire support part 410 is the insertion part 420 in the first embodiment. In the second embodiment, a relay connector 430 is applied as the wire support part 410. Specific description is given below.

The relay connector 430 is attached to the inner surface of the second holder 2 (refer to FIGS. 4 and 9A). As illustrated in FIG. 12, the wire 400A includes the flexible printed circuit board 400 extending from the liquid crystal panels 1 to the relay connector 430, and a wire harness 423 extending from the relay connector 430 to the substrate 82 (refer to FIGS. 4 and 9A). When the second holder 2 is rotated together with the relay connector 430 as indicated by an arrow, the wire harness 423 follows the rotation.

As illustrated in FIG. 13, the relay connector 430 includes a substrate body 431, a connector part 432, and a connector part 433. The connector part 432 is attached on the D1 side on the substrate body 431. The connector part 433 is attached on the D2 side on the substrate body 431. A non-illustrated terminal is provided at an end part 403 of the flexible printed circuit board 400 on the D2 side and electrically coupled to the connector part 432.

A non-illustrated terminal is provided at an end part 424 of a wire harness 42 on the D1 side and electrically coupled to the connector part 433. A wiring part 434 is provided inside the substrate body 431, the connector part 432, and the connector part 433. The flexible printed circuit board 400 and the wire harness 42 are electrically coupled to each other through the wiring part 434. The length of the wire harness 42 extending from the relay connector 430 to the substrate 82 is longer than the distance between the relay connector 430 and the substrate 82 in the axial direction. In other words, the wire harness 423 extending from the relay connector 430 to the substrate 82 is sagging like the first part 404 of the flexible printed circuit board 400 illustrated in FIG. 9B.

As described above, the wire support part 410 in the present embodiment is the relay connector 430 attached to the inner surface of the second holder 2. The wire 400A includes the flexible printed circuit board 400 and the wire harness 423, the flexible printed circuit board 400 extending from the liquid crystal panels 1 to the relay connector 430, the wire harness 423 extending from the relay connector 430 to the substrate 82. The flexible printed circuit board 400 and the wire harness 423 are electrically coupled to each other at the relay connector 430. Typically, the wire harness 423 has higher following capability than the flexible printed circuit board 400 does. When the second holder 2 is rotated together with the relay connector 430, the wire harness 423 follows the rotation, and thus damage on the wire harness 423 is further prevented.

The length of the wire harness 423 is longer than the distance between the relay connector 430 and the substrate 82 in the axial direction. With this configuration, the wire harness 423 is less likely to receive tension when the wire harness 423 is stretched as the second holder 2 is rotated, and damage on the wire harness 423 can be prevented.

What is claimed is:

1. An illumination device comprising:

a light source;

a liquid crystal panel disposed on one side in a first direction of the light source;

a first holder having a central axis extending in the first direction and holding the light source;

a second holder including a rotational support part, a panel holding cover, and a coupling part, the rotational support part being provided on an outer peripheral side of the first holder and supporting the first holder rotatably in a circumferential direction about the central axis, the panel holding cover holding the liquid crystal panel, the coupling part coupling the rotational support part and the panel holding cover;

a control board disposed on another side in the first direction of the first holder and configured to control the liquid crystal panel; and a wire extending in the first direction and electrically coupling the liquid crystal panel and the control board, wherein the second holder includes a wire support part supporting part of the wire.

2. The illumination device according to claim 1, wherein the rotational support part of the second holder includes a fitting part protruding inward in a radial direction, and a fitting counterpart that is slidable relative to the fitting part in the circumferential direction in a state of being fitted to the fitting part is provided on an outer peripheral surface of the first holder.

3. The illumination device according to claim 2, wherein the fitting part includes a first convex part protruding inward in the radial direction, and the fitting counterpart includes a second convex part protruding outward in the radial direction and being slidable relative to the first convex part.

4. The illumination device according to claim 3, wherein the wire is a flexible printed circuit board, and the wire support part is an insertion part provided on an inner surface of the second holder and the flexible printed circuit board passes inside the insertion part.

5. The illumination device according to claim 1, wherein the wire support part is a relay connector attached to an inner surface of the second holder, the wire includes a flexible printed circuit board and a wire harness, the flexible printed circuit board extending from the liquid crystal panel to the relay connector, the wire harness extending from the relay connector to the control board, and the flexible printed circuit board and the wire harness are electrically coupled to each other at the relay connector.

6. The illumination device according to claim 5, wherein the length of the wire harness is longer than the distance between the relay connector and the control board in the first direction.

7. The illumination device according to claim 1, wherein a plurality of the liquid crystal panels are stacked in the first direction, and the liquid crystal panels alternately overlap in the first direction as a liquid crystal panel for p-wave polarization and a liquid crystal panel for s-wave polarization.

* * * * *